(12) United States Patent
Novet

(10) Patent No.: US 10,139,869 B2
(45) Date of Patent: Nov. 27, 2018

(54) CAPACITIVE SENSORS FOR GRIP SENSING AND FINGER TRACKING

(71) Applicant: ANALOG DEVICES, INC., Norwood, MA (US)

(72) Inventor: Isaac Chase Novet, Carlsbad, CA (US)

(73) Assignee: ANALOG DEVICES, INC., Norwood, MA (US)

( * ) Notice: Subject to any disclaimer, the term of this patent is extended or adjusted under 35 U.S.C. 154(b) by 0 days.

(21) Appl. No.: 14/339,410

(22) Filed: Jul. 23, 2014

(65) Prior Publication Data

US 2016/0026216 A1    Jan. 28, 2016

(51) Int. Cl.
| | | |
|---|---|---|
| *G06F 1/16* | (2006.01) | |
| *G06F 3/044* | (2006.01) | |
| *G06F 3/0488* | (2013.01) | |

(52) U.S. Cl.
CPC .............. *G06F 1/169* (2013.01); *G06F 3/044* (2013.01); *G06F 3/0488* (2013.01); *G06F 3/04886* (2013.01); *G06F 2203/0339* (2013.01); *G06F 2203/04106* (2013.01)

(58) Field of Classification Search
CPC .... G06F 3/041; G06F 3/044; G06F 2203/041; G06F 2203/04104; G06F 2203/04106
USPC ................................. 345/169, 173
See application file for complete search history.

(56) References Cited

U.S. PATENT DOCUMENTS

| | | | |
|---|---|---|---|
| 5,729,200 A | 3/1998 | Copeland | |
| 6,731,121 B1 | 5/2004 | Hsu et al. | |
| 7,327,352 B2 * | 2/2008 | Keefer | G06F 3/045 |
| | | | 178/18.01 |
| 7,786,981 B2 * | 8/2010 | Proctor | G06F 3/03547 |
| | | | 178/18.01 |
| 8,417,296 B2 | 4/2013 | Caballero et al. | |
| 8,432,322 B2 | 4/2013 | Amm et al. | |
| 8,482,536 B1 | 7/2013 | Young | |
| 8,577,289 B2 | 11/2013 | Schlub et al. | |
| 8,744,418 B2 | 6/2014 | Novet | |

(Continued)

FOREIGN PATENT DOCUMENTS

| | | |
|---|---|---|
| CN | 1778123 | 5/2006 |
| CN | 101266743 B | 12/2010 |

(Continued)

OTHER PUBLICATIONS

Chinese Office Action in CN Patent Application Serial No. 2013010144378.4 dated Jan. 20, 2015, 6 pages (no translation).

(Continued)

*Primary Examiner* — Jason Mandeville
(74) *Attorney, Agent, or Firm* — Patent Capital Group

(57) ABSTRACT

Mobile devices are increasing aware of the environment surrounding the mobile devices. In many applications, it is useful for the mobile device to be able to sense different types of hand grips and/or where fingers are positioned with respect to the mobile device. The present disclosure describes a capacitive sensing apparatus particularly suitable for sensing hand grips and/or finger tracking along edges of a mobile device. The capacitive sensing apparatus comprises strips arranged along two lines, and the respective lengths and spacing are designed to allow optimal response behavior for sensing hand grips and/or tracking fingers.

18 Claims, 10 Drawing Sheets

(56) References Cited

U.S. PATENT DOCUMENTS

| | | | |
|---|---|---|---|
| 8,977,318 B2* | 3/2015 | Yu | H04M 1/00 |
| | | | 455/566 |
| 9,298,296 B2 | 3/2016 | Park | |
| 9,692,875 B2 | 6/2017 | Novet | |
| 2005/0035955 A1* | 2/2005 | Carter | H04M 1/72522 |
| | | | 345/175 |
| 2005/0122119 A1* | 6/2005 | Barlow | G01D 5/24 |
| | | | 324/662 |
| 2005/0141151 A1 | 6/2005 | Azodi | |
| 2005/0146509 A1* | 7/2005 | Geaghan | G06F 3/044 |
| | | | 345/173 |
| 2005/0243053 A1 | 11/2005 | Liess et al. | |
| 2006/0197750 A1* | 9/2006 | Kerr | G06F 1/1626 |
| | | | 345/173 |
| 2006/0238517 A1* | 10/2006 | King | G06F 1/1626 |
| | | | 345/173 |
| 2007/0291016 A1 | 12/2007 | Philipp | |
| 2009/0153500 A1 | 6/2009 | Cho | |
| 2009/0195959 A1* | 8/2009 | Ladouceur | G06F 3/0202 |
| | | | 361/283.1 |
| 2009/0224776 A1 | 9/2009 | Keith | |
| 2009/0239440 A1 | 9/2009 | Kang | |
| 2009/0315570 A1 | 12/2009 | Chappell et al. | |
| 2010/0134424 A1* | 6/2010 | Brisebois | G06F 3/03547 |
| | | | 345/173 |
| 2010/0138680 A1 | 6/2010 | Brisebois et al. | |
| 2010/0151916 A1 | 6/2010 | Baek et al. | |
| 2010/0153313 A1* | 6/2010 | Baldwin | G06F 1/1626 |
| | | | 706/11 |
| 2010/0164479 A1 | 7/2010 | Alameh et al. | |
| 2010/0187332 A1 | 7/2010 | Ushijima | |
| 2010/0308847 A1 | 12/2010 | Reynolds | |
| 2010/0313050 A1 | 12/2010 | Harrat et al. | |
| 2011/0156955 A1 | 6/2011 | Jeong | |
| 2011/0193573 A1 | 8/2011 | DeBoer | |
| 2011/0237306 A1 | 9/2011 | Kamii | |
| 2011/0250928 A1 | 10/2011 | Schlub et al. | |
| 2011/0263241 A1 | 10/2011 | Duarte et al. | |
| 2011/0277532 A1 | 11/2011 | Bartholomeyczik et al. | |
| 2011/0312279 A1 | 11/2011 | Tsai et al. | |
| 2012/0032916 A1 | 2/2012 | Enoki | |
| 2012/0052872 A1 | 3/2012 | Do | |
| 2012/0071203 A1 | 3/2012 | Wong | |
| 2012/0116548 A1 | 5/2012 | Goree et al. | |
| 2012/0218213 A1 | 8/2012 | Ciesla et al. | |
| 2012/0290227 A1 | 11/2012 | Estrada | |
| 2012/0323513 A1 | 12/2012 | Prance et al. | |
| 2013/0029625 A1 | 1/2013 | Park et al. | |
| 2013/0045751 A1 | 2/2013 | Chao et al. | |
| 2013/0050233 A1 | 2/2013 | Hirsch | |
| 2013/0157726 A1 | 6/2013 | Miyazaki et al. | |
| 2013/0217342 A1 | 8/2013 | Abdul-Gaffoor et al. | |
| 2013/0300668 A1 | 11/2013 | Churikov et al. | |
| 2013/0335319 A1 | 12/2013 | Balasundaram | |
| 2014/0066124 A1 | 3/2014 | Novet | |
| 2014/0078086 A1 | 3/2014 | Bledsoe et al. | |
| 2014/0125612 A1 | 5/2014 | Park et al. | |
| 2014/0340338 A1* | 11/2014 | Kim | G06F 3/0488 |
| | | | 345/173 |
| 2015/0029113 A1* | 1/2015 | Lee | G06F 3/0412 |
| | | | 345/173 |
| 2015/0237183 A1 | 8/2015 | Novet | |
| 2017/0324860 A1 | 11/2017 | Novet | |

FOREIGN PATENT DOCUMENTS

| | | |
|---|---|---|
| CN | 102520797 A | 6/2012 |
| CN | 102566911 A | 7/2012 |
| CN | ZL 20131044378.4 | 9/2015 |
| EP | 2175344 A2 | 4/2010 |
| EP | 2527955 A1 | 5/2011 |
| KR | 10-2005-0013573 | 2/2005 |
| KR | 10-2014-0020128 | 2/2014 |
| WO | 2004/081751 | 9/2004 |
| WO | 2012050875 A1 | 4/2012 |
| WO | 2012092318 A2 | 7/2012 |
| WO | 2013103690 A1 | 7/2013 |
| WO | 2014036532 A1 | 3/2014 |

OTHER PUBLICATIONS

English Summary of Chinese Office Action in CN Patent Application Serial No. 2013010144378.4 dated Jan. 20, 2015, 1 page.
Machine Translation (English) of CN Publication No. 102520797A (obtained from Google Patents on May 7, 2015), 5 pages.
Machine Translation (English) of CN Publication No. 102566911A (obtained from Google Patents on May 7, 2015), 5 pages.
Machine Translation (English) of CN Publication No. 101266743B (obtained from Google Patents on May 7, 2015), 13 pages.
Non-Final Office Action in U.S. Appl. No. 13/794,363 dated Sep. 16, 2013.
Supplemental Amendment to Response to Non-Final Office Action in U.S. Appl. No. 13/794,363, filed Jan. 15, 2014.
U.S. Appl. No. 14/634,201, filed Feb. 27, 2015.
Written Opinion and International Search Report in PCT/US2013/057726 dated Dec. 19, 2013 (6 pages).
Chinese Patent Application Serial No. 2013010144378.4 filed Apr. 24, 2013.
Chinese Office Action in U.S. Patent Application Serial No. 2013010144378.4 dated Jan. 20, 2015, 6 pages (no translation).
Korean Patent Application Serial No. 10-2013-0040341 filed Apr. 24, 2013.
Korean Office Action in Korean Patent Application Serial No. 10-2013-0040341 dated Apr. 25, 2014, 41 pages.
English Translation of Korean Office Action in Korean Patent Application Serial No. 10-2013-0040341, 4 pages.
Translation and Response to Amendments and Arguments in Korean Office Action in Korean Patent Application Serial No. 10-2013-0040341 filed Jun. 24, 2014, 26 pages.
Translation and Notice of Allowance for Korean Patent Application Serial No. 10-2013-0040341 dated Oct. 7, 2014, 3 pages.
Sean Buckley, "Cirque's Proximity and Grip Sensor Knows Your Left From Your Right, Won't Let You Turn Up Your Car Stereo," www.engadget.com/2012/02/24/cirques-promixity-and-grip-sensor-knows-your-left-from-your-rig/, pp. 1-3.
Tyler Berryhill, "1-µA Capacitive Grip Detection Based on MSP430™ Microcontrollers," Application Report, SLAA515A—Dec. 2011—Revised Mar. 2013, pp. 1-10.
Raphael Wimmer et al., "Thracker-Using Capacitive Sensing for Gesture Recognition," Research Group Embedded Interaction, University of Munich, pp. 1-6.
"Touché: Touch and Gesture Sensing for the Real World," Disney Research, Jul. 12, 2013, © 2012 Disney, pp. 1-3.
Sebastian Anthony, "Disney Touché Turns Everyday Objects Into Multi-Touch, Gesture-Recognizing Interfaces," ExtremeTech, Jul. 12, 2013, www.extremetech.com/computing/128715-disney-touche-turns-everyday-objects-into-multi-touch-gesture-recognizing-interfaces, pp. 1-3.
Munehiko Sato et al., "Touché: Enhancing Touch Interaction on Humans, Screens, Liquids, and Everyday Objects," CHI '12, May 5-10, 2012, Austin, Texas, USA, © 2012 ACM 978-1-4503-1015-4-12/05, pp. 1-10.
Kee-Eung Kim et al., "Hand Grip Pattern Recognition for Mobile User Interfaces", Interaction Lab, Samsung Advanced Institute of Technology, Suwon, Korea, © 2006, American Association for Artificial Intelligence (www.aaai.org), 6 pages.
Application Note, "Atmel AT03152: Proximity Sensing for SAR", Atmel Touch Sensors, 42158B-Touchsensors—Aug. 2013, 7 pages.
Patrick Hanley, "Capacitive Proximity Sensing Technology Update", Capacitive Proximity Sensing Technology Update:: Radio-Electronics.com, Dec. 10, 2012, online at: http://www.radio-electronics.com/, Apr. 18, 2014, 7 pages.
Datasheet—Production Data, "STM8T143—Single-channel capacitive sensor for touch and proximity detection", ST life.augmented, Jan. 2014, DocID18315 Rev 7, www.st.com, 65 pages.

(56) References Cited

OTHER PUBLICATIONS

Samer Bahou, "Cypress's TrueTouch® Gen4 Touchscreen Controllers Deliver New Advanced Features Including Industry's Best Tracking of Gloved Fingers", May 28, 2013, Cypress Semiconductor Corp. © 2014, 2 pages.
Sivaguru Noopuran et al., "Exclusive: Promixity Sensing in Mobile Phones", Jan. 31, 2014, Wireless Design and Development (WDD), online at: http://www.wirelessdesignmag.com/articles/2014/01/exclusive-proximity-sensing-mobile-phones, 12 pages.
Mayank Goel et al., "GripSense: Using Built-In Sensors to Detect Hand Posture and Pressure on Commonidity Mobile Phones", UIST '12, Oct. 7-10, 2012, Cambridge, Massachusetts, USA, © 2012 ACM 978-1-4503-1580-7/12/10 . . . $15.00, 10 pages.
Sami Myllymäki, "Capacitive Antenna Sensor for User Proximity Recognition", ACTA, Universitatis Ouluensis, Oulu 2012, C 429, Univerity of Oulu, Oulu 2012, 60 pages.
Datong Chen et al., "An Architecture for Multi-Sensor Fusion in Mobile Environments", University of Karlsruhe, Karlruhe, Germany, 8 pages.
Wook Chang et al., "Recognition of Grip-Patterns by Using Capacitive Touch Sensors," IEEE ISIE 2006, Jul. 9-12, 2006, Montréal, Québec, Canada, 1-4244-0497-5/06/$20.00 © 2006 IEEE, 6 pages.
Masakutsu Tsukamoto et al., "User Interface Using National Gripping Features—Grip UI", Technology Reports, © 2014 NTT DOCOMO, Inc., NTT DOCOMO Technical Journal V. 15 No. 3, 8 pages.
Nicholas Cravotta, "Optimizing Proximity Sensing for Consumer Electronics Applications", Digi-Key Corporation, Apr. 26, 2012, online at http://www.digikey.com/en-US/articles/techzone/2012/apr/optimizing-proximity-sensing-for-consumer-electronics-applications, 5 pages.
Holly Gu et al., "1-µA Capacitive Grip Detection Based on MSP430™ Microcontrollers," Application Report, SLAA515B—Aug. 2013, 15 pages.
Travis Hwang, "10-cm Capacitive Proximity Detection with MSP430™ Microcontrollers," Application Report, SLAA521A—Jul. 2013, 9 pages.
SX9300 Ultra Low Power, Dual Channel, Smart Proximity SAR Compliant Solution, SEMTECH, Wireless & Sensing, Revision 4, Feb. 5, 2014, © 2014 Semtech Corporation, www.semtech.com, 39 pages.
Brandon Thomas Tyler, "Graspables: Grasp Recognition as a User Interface", © Massachusetts Institute of Technology, 2008, 87 pages.
Cypress, "Take the Next Step with TrueTouch", touch.cypress.com, © 2013 Cypress Semiconductor Corporation, 2 pages.
Ronak Desai, "Using MCUs in Cell Phone and Tablet Apps", Apr. 2, 2014, Cypress Semiconductor Corp., 9 pages.
Fatemeh Aezinia et al., "Three Dimensional Touchless Tracking of Objects Using Integrated Capacitive Sensors", IEEE Transactions on Consumer Electronics, vol. 58, No. 3, Aug. 2012, pp. 886-890, 5 pages.
English Response to Chinese Office Action in CN Patent Application Serial No. 2013010144378.4 filed May 29, 2015, 13 pages.
European Search Report in EP Patent Application Serial No. 15175842.2 dated Nov. 16, 2015, 7 pages.
Non-Final Office Action issued in U.S. Appl. No. 14/634,201 dated Jul. 6, 2016, 20 pages.
Notice of Allowance for U.S. Appl. No. 14/634,201 dated Oct. 24, 2016, 10 pages.
Non-Final Preliminary Rejection issued in KR Patent Application Serial No. 10-2015-0098380 dated Dec. 13, 2016, 13 pages, including an EN summary of the action.
Non-Final Office Action issued in U.S. Appl. No. 15/632,864 dated Jan. 18, 2018, 18 pages.
Office Action issued in CN Patent Application Serial No. 201510429952.X dated Nov. 1, 2017, 9 pages.

\* cited by examiner

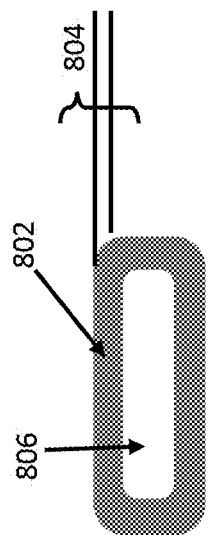
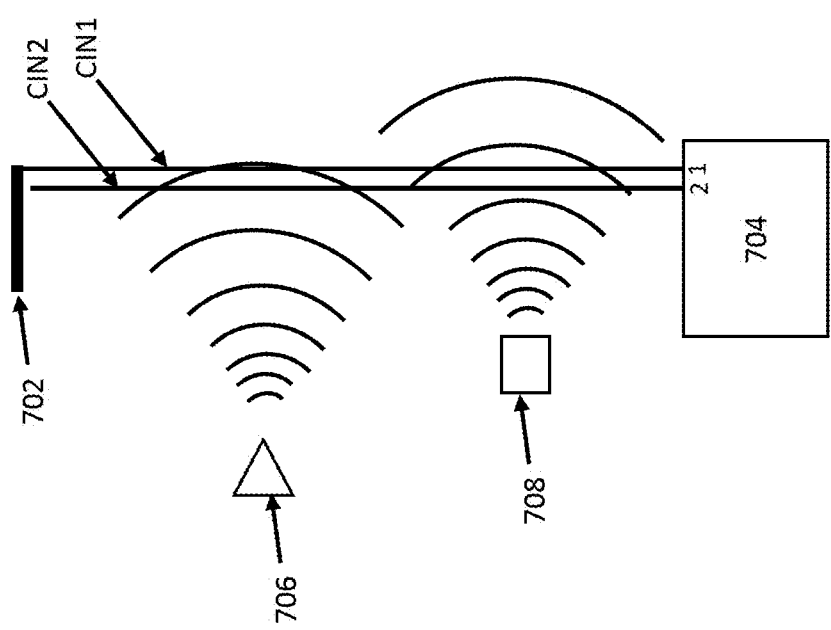

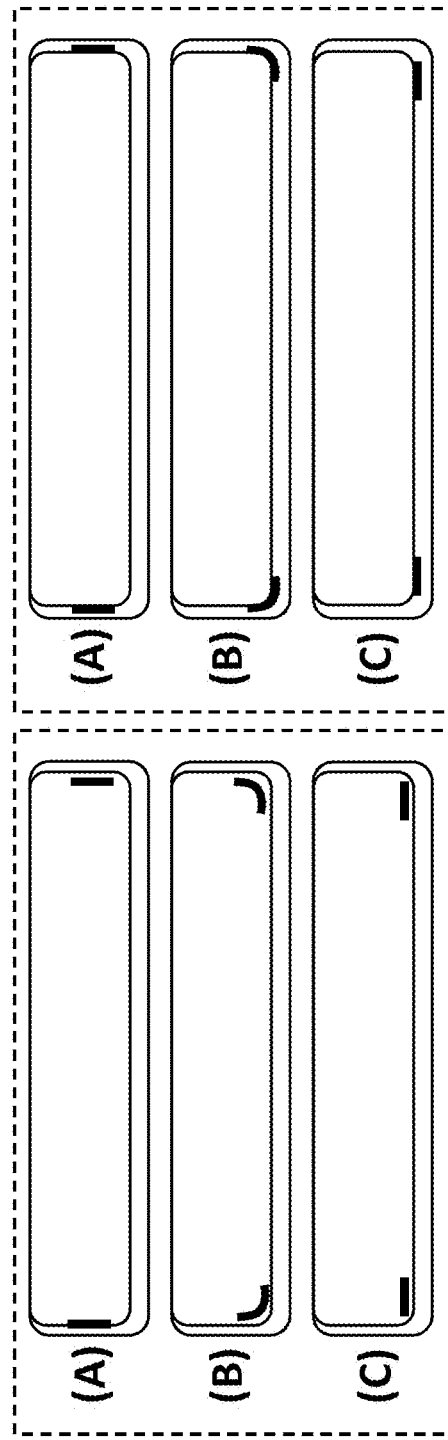
FIGURE 9
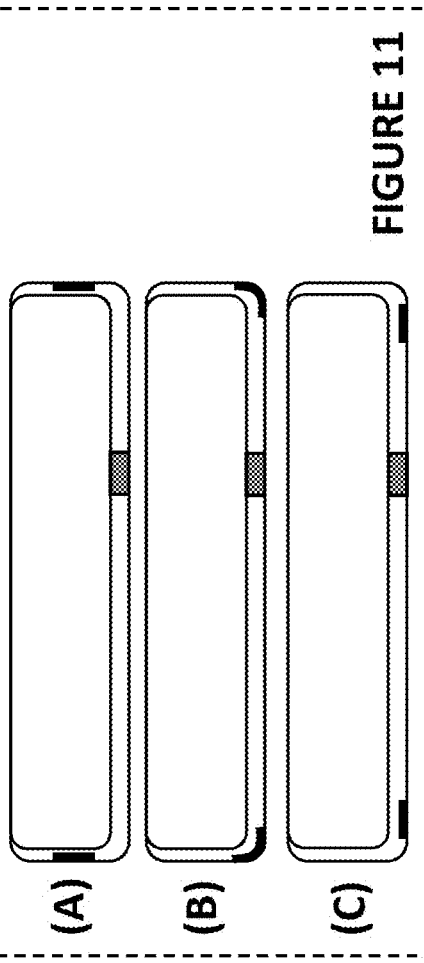
FIGURE 10
FIGURE 11
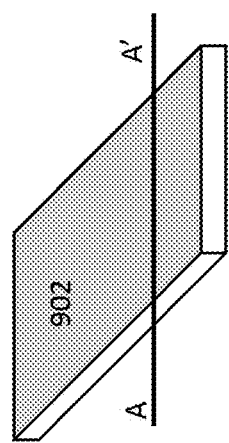

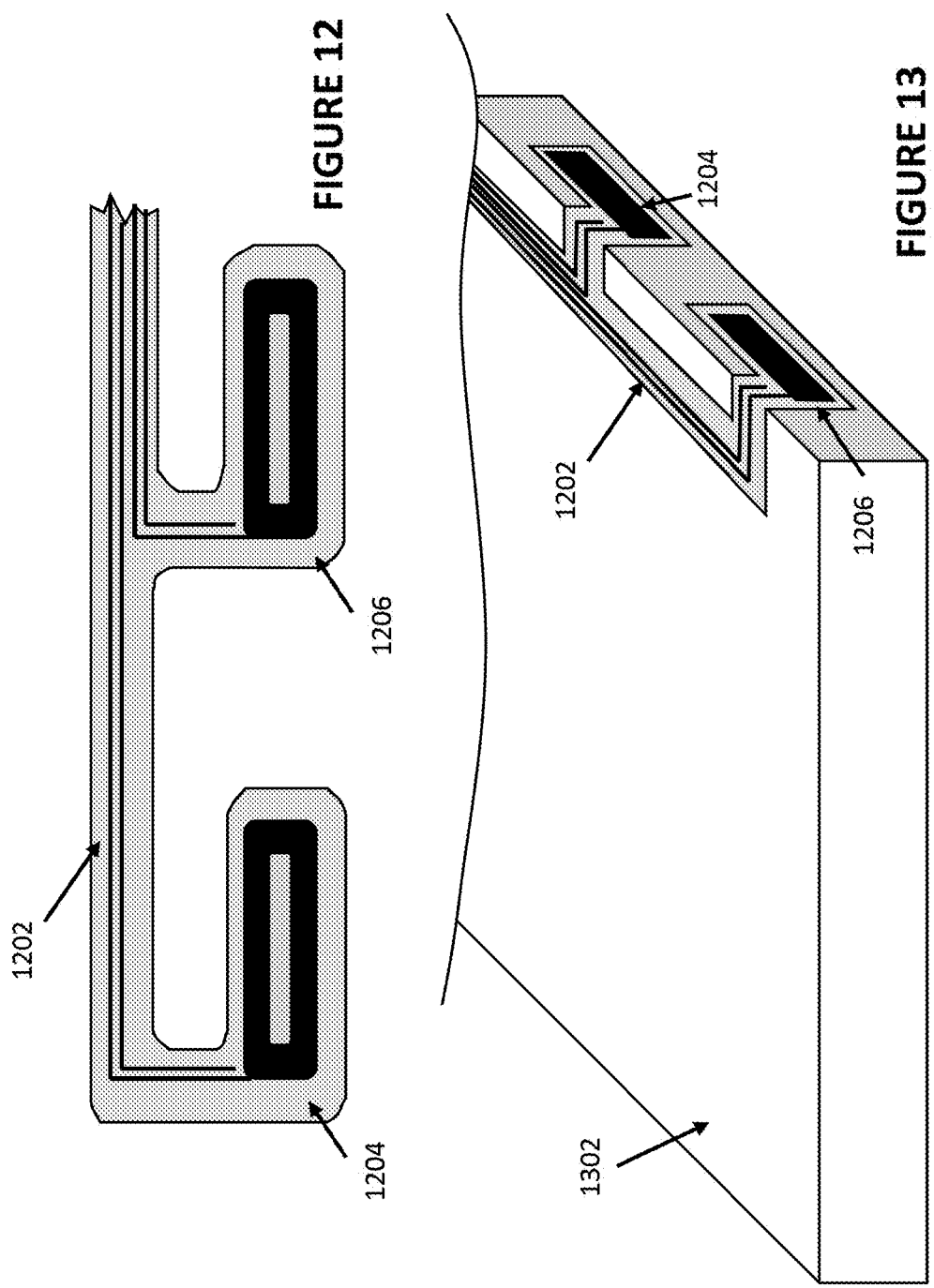

CAPACITIVE SENSORS FOR GRIP SENSING AND FINGER TRACKING

TECHNICAL FIELD OF THE DISCLOSURE

The present invention relates to the field of sensors, in particular to capacitive sensors for grip sensing and finger tracking usable with mobile devices.

BACKGROUND

Mobile devices are ubiquitous. The ways to interact with them and the ways mobile devices behave have evolved over time. One important technology for mobile devices is their sensing capabilities. Sensing can occur via many modalities, such as haptic/pressure sensing, audio sensing, light/vision sensing, temperature sensing, and capacitive sensing. Not only can these modalities allow us to interact with the mobile device in a myriad of different ways, these modalities allow the mobile device to become "smarter" such that the mobile devices can better understand contexts and the way users are interacting with the mobile devices.

One interesting modality is capacitive sensing. Capacitive sensing has been used with touch screens for some time to allow user to provide user input via the screen of a mobile device without the use of physical buttons. In some applications, capacitive sensing on a large surface/skin can even be used for sensing grip or hand postures. In some other applications, two electrodes can be provided, one on each side of a mobile device for whole hand recognition. In yet some other applications, an electrode can be provided adjacent to an antenna to detect the presence of a finger or hand in close proximity to the antenna.

Overview

Mobile devices are increasingly aware of the environment surrounding the mobile devices. In many applications, it is useful for the mobile device to be able to sense different types of hand grips and/or where fingers are positioned with respect to the mobile device. The present disclosure describes a capacitive sensing apparatus particularly suitable for sensing hand grips and/or finger tracking along sides or edges of a mobile device.

Many of conventional capacitive sensing applications are limited in the number of grips it can sense or distinguish. Furthermore, many of these applications cannot precisely track the position of a finger near the mobile device. The capacitive sensing apparatus disclosed herein comprises capacitive sensing strips arranged along two lines (one line on each side of the device). The respective lengths and spacing are designed to allow optimal response behavior for sensing hand grips and/or tracking fingers.

Within the context of the disclosure, a strip is defined as a piece of material having an elongated shape (as opposed to a dot of material which is not long). The strip can be a long and narrow piece of material. The strip can be substantially flat and thin.

BRIEF DESCRIPTION OF THE DRAWING

To provide a more complete understanding of the present disclosure and features and advantages thereof, reference is made to the following description, taken in conjunction with the accompanying figures, wherein like reference numerals represent like parts, in which:

FIG. 7 shows an exemplary capacitive sensing apparatus for a mobile device having differential tracing, according to some embodiments of the disclosure;

FIG. 8 shows an exemplary capacitive sensor of the capacitive sensing apparatus, according to some embodiments of the disclosure;

FIGS. 9A-C, 10A-C, and 11A-C show exemplary placements of the capacitive sensing apparatus with respect to an inner chassis and an outer shell of a mobile device, according to some embodiments of the disclosure;

FIG. 12 shows an exemplary capacitive sensing apparatus in the form of a flexible circuit, according to some embodiments of the disclosure;

FIG. 13 shows an exemplary capacitive sensing apparatus arranged with respect to a mobile device, according to some embodiments of the disclosure; and FIG. 14 shows an exemplary capacitive sensing apparatus having L-shaped capacitive sensors, according to some embodiments of the disclosure.

DESCRIPTION OF EXAMPLE EMBODIMENTS OF THE DISCLOSURE

Figure 1:
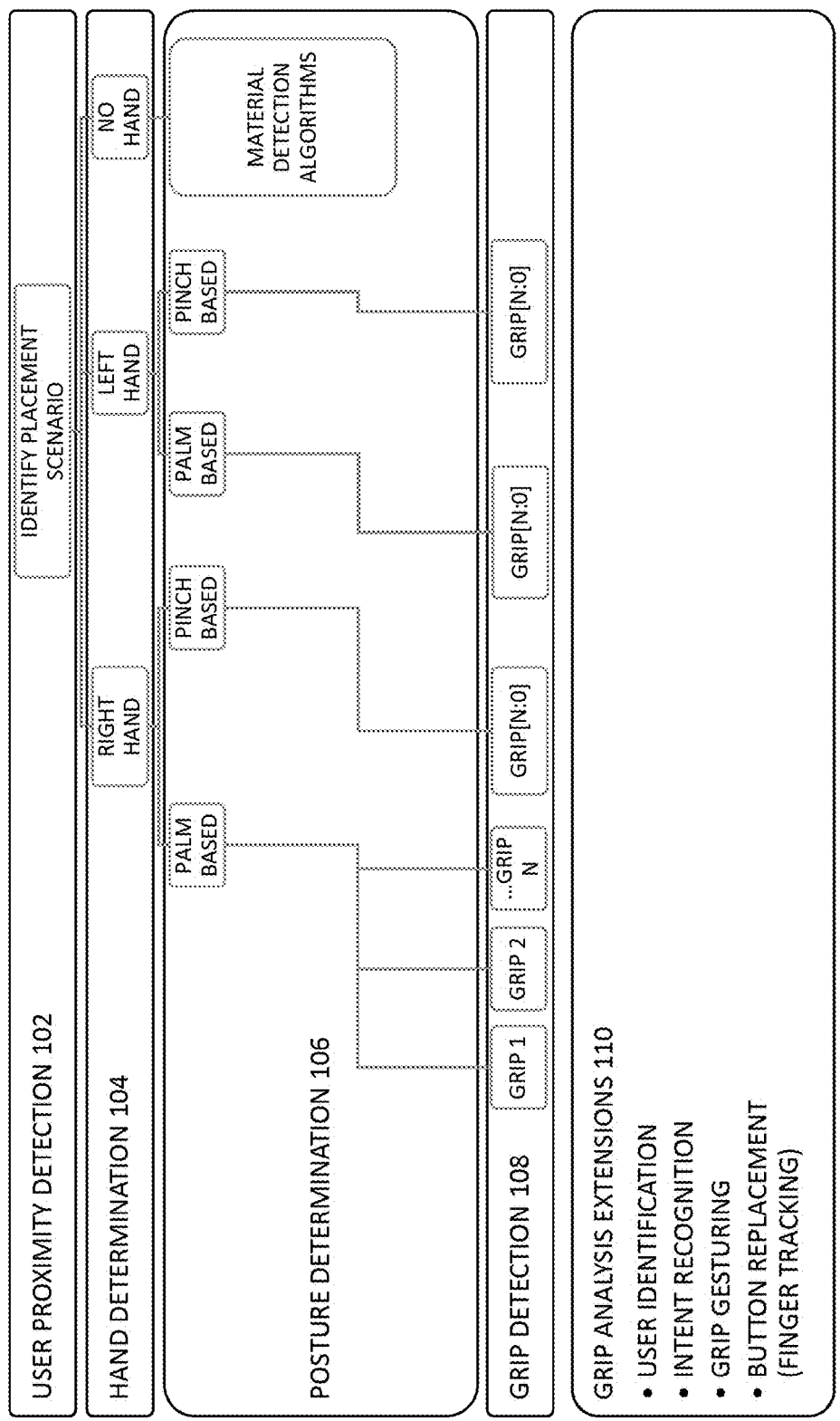
FIG. 1 shows exemplary analysis for grip sensing and possible extensions including finger tracking, according to some embodiments of the disclosure.

Capacitive Sensing and its Applications in Mobile Devices

Capacitive sensing is used in many different types of sensors, including those to detect and measure proximity, position or displacement, humidity, fluid level, and acceleration. Capacitive sensing as a human interface device (HID) technology (for example, to replace the computer mouse) has become more popular. The HID technology can be based on capacitive coupling, which takes human body capacitance as input. Capacitive touch sensors are used in many devices such as laptop trackpads, digital audio players, computer displays/touch screens, mobile phones, mobile devices, tablets, etc. Design engineers continue to choose capacitive sensors for their versatility, reliability and robustness, unique human-device interface, and cost reduction over mechanical switches.

Capacitive sensors generally detect anything that is conductive or has a dielectric different than that of air, for example, part of a human hand or finger. When an excitation signal charges a capacitive sensor (e.g., an electrode), the capacitive sensor becomes one of the two plates of a virtual capacitor. When an object comes close to the capacitive sensor acting as the second plate of the virtual capacitor, the virtual capacitance based on the charge present on the capacitive sensor can be measured, e.g., by a capacitive sensing controller. A capacitive sensing controller is an electronic device which can include an analog front end which is configured to measure the virtual capacitance and convert the analog measurement to digital data. Some capacitive sensing controllers can generate high resolution capacitive measurement data, as high as 16-bits or more for each capacitive sensor. The capacitive sensing controller can also provide an excitation source for providing the excitation signal to the capacitive sensor. Typically, the capacitive sensing controller can have a plurality of input pins connectable to a number of capacitive sensors.

Capacitive sensing for mobile devices is particularly useful for sensing a dynamic environment surrounding the mobile device. Electrodes as capacitive sensors can be inexpensive and these electrodes can be extremely compact and thin, which makes capacitive sensing particularly suitable for mobile devices whose form factor can impose constraints on the electronics inside them. For instance, capacitive sensing can obviate the need for mechanical buttons which can often be difficult to provide in a mobile device, whose design constraints continuously drives the devices to be smaller, smoother and/or waterproof.

Mobile devices within the context of this disclosure includes electronic devices which can be held by one or more hands of a user or users (the electronic devices can be completely mobile, and the electronic devices can be tethered to other electronics). Mobile devices, by virtue of having a small form factor, are usually held by a user's hand or hands during use. Mobile devices can include mobile phones, tablets, laptops, etc. While the present disclosure focuses on examples related to these types of mobile devices having form factors which can be held easily by hands of a user, the sensor arrangements described herein are also applicable to electronic devices in general. For instance, exemplary electronic devices can include steering wheels, gaming console controllers, household appliances, interactive displays, etc. Broadly speaking, it is understood by one skilled in the art that the sensor arrangements disclosed herein can be applied to electronic devices which users are expected to interact with using their hands and/or fingers.

Understanding Grip Sensing and Finger Tracking

Figure 2:
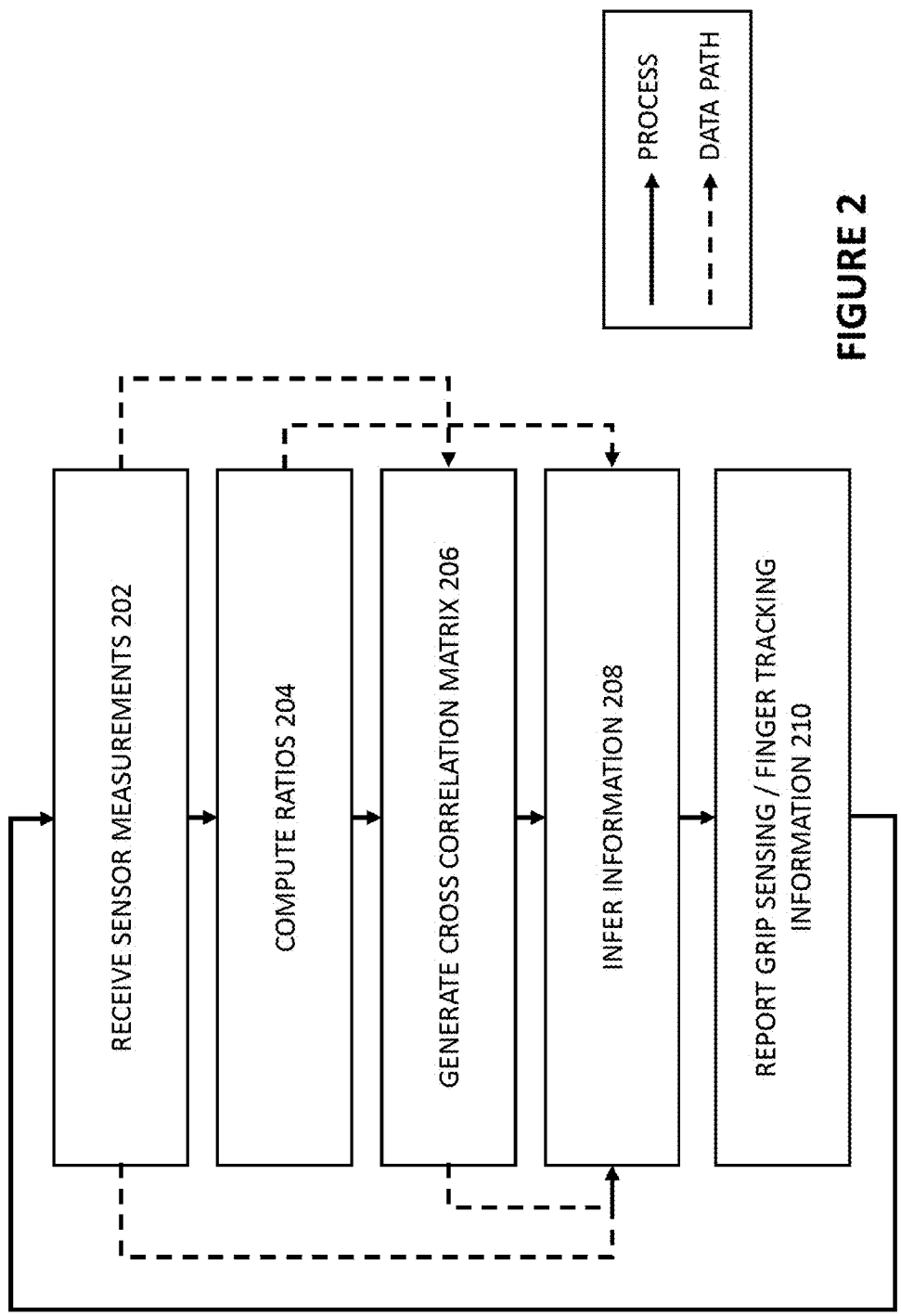
FIG. 2 shows an exemplary method for grip sensing and/or finger tracking, according to some embodiments of the disclosure.

Grip sensing within the context of this disclosure encompasses the sensing of how a user is holding a mobile device. The concept of grip sensing is more than just a simple activation or detection of whether the user is holding the device or not, or a simple determination whether a person is nearby or not. Grip sensing can sense a variety grips—manners in which a user is holding and physically interacting with the mobile device. Finger tracking can determine the position and/or movement of fingers near the mobile device. FIGS. 1 and 2 describes exemplary procedures for grip sensing and/or finger tracking.

FIG. 1 shows exemplary analysis for grip sensing and possible extensions including finger tracking, according to some embodiments of the disclosure. A mobile device having a proper capacitive sensing apparatus can determine a lot of different types of information by analyzing capacitive measurement data.

At USER PROXIMITY DETECTION layer 102, capacitive sensing can identify if a human is nearby, or if the mobile device is being held by an inanimate object. In some cases, capacitive sensing can even triangulate capacitive measurements to determine the distance and movement of one or more users nearby. Furthermore, capacitive sensing can infer placement scenarios for the mobile device (e.g., is it on a table, is it inside a purse, is a user holding the device, etc.).

At HAND DETERMINATION layer 104, capacitive sensing can determine handedness. For instance, capacitive sensing can determine whether a right hand, a left hand, or both hands, or no hand is holding the mobile device.

At POSTURE DETERMINATION layer 106, capacitive sensing can determine whether a grip is palm based or pinch based. Palm grips are defined as a family of grips where some portion of the mobile device is held in the hand by frictional forces resulting from skin on the palm or base knuckle areas. Pinch grips are defined as a family of grips where the frictional forces used to hold the phone are provided primarily by the thumb tip and some combination of fingertips or other surfaces. If no hand was detected, capacitive sensing can perform material detection algorithms using capacitance's relationship with dielectric constants to infer information about the surrounding environment.

At GRIP DETECTION layer 108, capacitive sensing can determine a particular type of grip from the capacitive sensor measurements. Exemplary grips include: three finger palm grip, five finger palm grip, two finger pinch, three finger pinch, etc. The types of grips can be nuanced, and in some cases, capacitive sensing can accurately distinguish between 25 or more grips.

At GRIP ANALYSIS EXTENSIONS layer 110, capacitive sensing can derive other information besides grip, such as user identification, intent recognition, grip gesturing (e.g., detect a sequence of grips), and finger tracking (e.g., for button replacement, finger gestures). There are extended features which are made available by analyzing the raw and derived data given to and taken from the grip algorithm. Grip meta-analysis can identify if the primary user of the mobile device is currently providing the grip information. Also, intent recognition, such as a thumb straining to reach across a screen, is identifiable. Grip gesturing and/or finger tracking can encompass using grip as a user input mechanism for implicit commands, like lock and unlock of the screen upon grip sequence. Explicit input, such as fingers sliding or tapping on the case or outer shell of a mobile device, can be taken to replace physical buttons. Applications could make use of arbitrarily placed and numbered buttons and sliders on the mobile phone's case.

By applying these exemplary layers of analysis on capacitive sensor data, a mobile device can derive information about the relationship between a user and the mobile device. For instance, grip sensing can provide a user interface where a user can provide user input to the mobile device. In another instance, grip sensing can allow the mobile device to adjust an internal characteristic such as antenna tuning or beam forming. In yet another instance, grip sensing related to the general posture of the hand can indicate a usage scenario, and/or user intent. Grip sensing and extensions thereof can introduce new ways for a user to interact with the mobile device in more convenient ways.

FIG. 2 shows an exemplary method for grip sensing and/or finger tracking, according to some embodiments of the disclosure. Other methods can be used, and the method shown in FIG. 2 merely illustrates an exemplary method for grip sensing and/or finger tracking. A mobile device having a capacitive sensing controller, and a capacitive sensing apparatus, either or both of which can perform at least a part of the exemplary method. A grip sensing and/or finger tracking module can perform at least a part of the exemplary method to derive grip information and finger information. The grip sensing and/or finger tracking module can be provided at least in part in any one or more of the following: the mobile device, an electronic device communicably connected to the mobile device, and an electronic device in a cloud service, etc. Data generated from the method is stored in a storage (e.g., memory), which can be provided at least in part with any one of the following: the mobile device, an electronic device communicably connected to the mobile device, and a cloud service, etc.

The method includes, in box 202, receiving capacitive sensing measurements (measured by capacitive sensors) from the capacitive sensing controller. The measurements as pieces of data can be stored in an array (or some other suitable data structure) maintained in the storage. It is possible that other measurements via other modalities can be recorded as pieces of data in the array as well (e.g., temperature readings, accelerometer readings, etc.)

In box 204, the method proceeds to compute ratios from the measurements. One example of a ratio computed at this stage may include a gain independent ratio:

$$\frac{A-B}{A+B},$$

where A is a sensor measurement from one capacitive sensor, and B is a sensor measurement for another capacitive sensor. Any suitable number of pairs of sensor measurements can be used to computer a plurality of ratio values. The ratio values can be stored as pieces of data in an array (or some other suitable data structure) maintained in the storage. Such ratios allow motion artifacts to be cancelled out from the capacitive sensor measurements. Besides computing ratios, other values can also be computed by the method and stored in the array. The other values include first and second derivatives with respect to time (e.g., using past capacitive sensing measurements), trigonometric data based on a plurality of capacitive sensor measurements, etc.

The method can optionally include, in box 206, generating a cross-correlation matrix based on pieces of data obtained in box 202 and/or box 204. Correlation, within the present disclosure, relates what piece of data is increasing/decreasing/unchanging while another piece of data is increasing/decreasing/unchanging. A matrix or table pairing different pieces of data can be generated to formulate observed relationships between two pieces of data. For instance, the method can determine whether one piece of data is positively correlated with another piece of data and store such a correlation in a cross-correlation matrix maintained in the storage. Likewise, the method can determine whether one piece of data is negatively correlated with another piece of data, and store such a correlation in the cross-correlation matrix. No correlation (e.g., two pieces of data had not changed or remained stable) can also be recorded in the cross-correlation matrix.

The method can include, in box 208, inferring information about the relationship of the mobile device with the environment and/or user. The inferring step can take a variety of inputs, including one or more of: pieces of data obtained in box 202, pieces of data obtained in box 204, and entries in the cross-correlation matrix from box 206. The inferring step can apply one or more suitable artificial intelligence algorithms (e.g., rules-based classifiers, decision trees, k-NN algorithms probabilistic classifiers (such as Naïve Bayesian classifiers), linear classifiers, logistic regressions, neural networks, perceptrons, support vector machines, clustering algorithms, etc.) Any number of artificial intelligence algorithms can be used, as long as it is configured to infer grip and/or finger information from the data with sufficient accuracy for the application.

Based on output(s) from box 208, the method includes reporting grip sensing and/or finger tracking information to another module for processing. For instance, an application running on the mobile device can take the reported information and interpret the information as a valid user input.

Importance of Spatial Arrangement of Capacitive Sensors in a Capacitive Sensing Apparatus Designs for capacitive sensor apparatuses are not trivial. The placement and physical design of capacitive sensors can significantly affect the performance of algorithms providing grip sensing and/or finger tracking. For this reason, a designer must use care when providing capacitive sensors for a capacitive sensing apparatus. Bad sensors would not be able to provide the appropriate data for distinguishing nuanced grips accurately, or detect where a finger is relative to the mobile device precisely. The present disclosure describes a capacitive sensor apparatus having a unique spatial arrangement and physical design of its capacitive sensors aimed for optimal grip sensing and/or finger tracking results.

Example:4-Sensor Design

Figure 3:
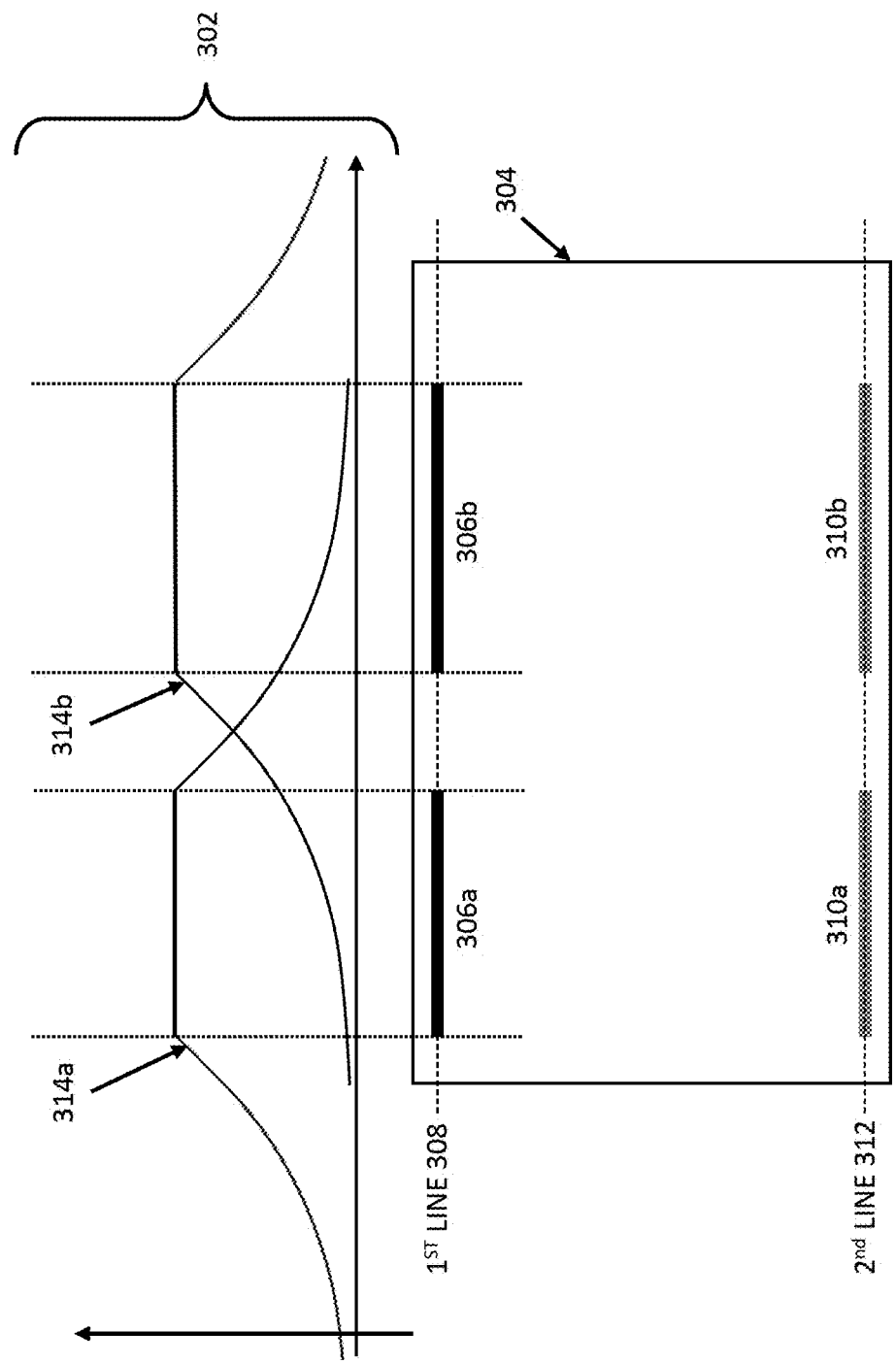
FIG. 3 shows an exemplary capacitive sensing apparatus for a mobile device and illustrative response curves generated by capacitive sensors of the capacitive sensing apparatus, according to some embodiments of the disclosure.

FIG. 3 shows an exemplary capacitive sensing apparatus for a mobile device and illustrative response curves generated by capacitive sensors of the capacitive sensing apparatus, according to some embodiments of the disclosure. The FIGURE include an exemplary response plot 302 and an exemplary mobile device 304 (e.g., a smart phone, a tablet, etc.). Furthermore, the FIGURE shows an exemplary capacitive sensing apparatus usable with the mobile device 304. The capacitive sensing apparatus can have 2 sensors on each side, which makes up a total of 4 sensors altogether.

In this example, the capacitive sensing apparatus comprises first capacitive sensors including first strips 306a and 306b spatially arranged substantially along a first line 308. The first capacitive sensors are preferably positioned near one edge or side of the mobile device to which a user's hand is expected to touch frequently. The alignment of the first strips 306a and 306b to the first line do not have to be exact, but it is preferred that the first strips 306a and 306b are spatially arranged as segments in a line to substantially match up the (substantially straight) edge of the mobile device 304.

The exemplary capacitive sensing apparatus includes second capacitive sensors which includes second strips 310a and 310b spatially arranged substantially along a second line 312. The second capacitive sensors are preferably positioned near the other/opposite edge or side of the mobile device to which a user's hand is expected to touch frequently. The second line 312 can be substantially parallel to the first line 308, especially if the mobile is in a rectangular form, and a user is expected to grip the mobile device on two opposite sides. The alignment of the second strips 310a and 310b to the second line do not have to be exact, but it is preferred that the second strips 310a and 310b are spatially arranged as segments in a line to substantially match up the other (substantially straight) edge of the mobile device 304.

The response plot 302 shows responses 314a and 314b generated by respective capacitive sensors (first strips 306a and 306b) when a small metal ball is rolled along a first side of the mobile device 304. The responses 314a and 314b correspond to capacitive sensor measurements obtained by respective capacitive sensors (first strips 306a and 306b) with respect to the metal ball's position along the first side of the mobile device 304 or near the first line 308. The metal ball simulates a human hand or object moving along a side of the mobile device near the first strips. The response plot 302 serves to illustrate a characteristic behavior of the first capacitive sensors and the second capacitive sensors. For simplicity, a response plot for just the first capacitive sensors are shown because the characteristic behavior of the second capacitive sensors correspond to the characteristic behavior of the first capacitive sensors.

As it can be seen from the responses 314a and 314b generated by first strips 306a and 306b, each of the first strips is configured to generate a respective characteristics response from an object positioned near the first line. The respective response generated by each of the first strips is saturated when the object is positioned along the length of the respective first strip. This behavior can be seen from the flat, non-varying response (the "dead zone") when the object is rolling along the length of the first strip. Generally speaking, the dead zone is not optimal for grip sensing and/or finger tracking because the information cannot be easily related to position of a part of a hand and/or finger on the side of the mobile device due to its non-varying behavior. Furthermore, the respective response tapers off as the object moves away from the ends of each of the first strips. This behavior can be seen from the tail responses when the object is rolling away from the ends of the first strips. The tapering off of the response can be related to 1/distance of the object from an end of a first strip. The tail response is usually better for grip sensing and/or finger tracking because the information can be related to position of the part of a hand and/or finger on the side of the mobile device.

In the example shown in FIG. 3, the first capacitive sensors (on one side of the mobile device 304) has two first strips 306a and 306b, each generating respective responses 314a and 314b. A similar set of first strips (e.g., second strips 310a and 310b) would exhibit similar behavior as the first strips 306a and 306b on the other side of the mobile device 304.

The following outlines some of the illustrative features of the responses 314a and 314b:

The left tail of response 314b extends into the dead zone of response 314a. Even though response 314a has a dead zone along the length of first strip 306a, the varying response of 314b provides information for grip sensing and/or finger tracking algorithm to infer position information for an object along the length of the first strip 306a.

The right tail of response 314a extends into the dead zone of response 314b along the length of first strip 306b. The varying response of 314a provides information for grip sensing and/or finger tracking algorithm to infer position information for an object along the length of the first strip 306b.

The right tail of response 314a overlaps with the left tail of 314a in the spacing between first strip 306a and first strip 306b, which can allow an algorithm to infer position information for an object moving along the span of the spacing between the two strips.

As it can be seen from the response plot 302, the spacings and lengths of the capacitive sensors ensures that one or more of the strips is generating a tapering/increasing response at any point over the length of the side of the mobile device 304. This desirable characteristic of the capacitive sensors can help a grip sensing and/or finger tracking algorithm to determine nuanced grips and/or precisely determine the position of a finger along the side of the mobile device 304.

General Design Considerations Related to Length of Strips and Spacing Between Strips The characteristic response of the strips being used as capacitive sensors is an important consideration when designing the proper capacitive sensing apparatus with optimal grip sensing and/or finger tracking capabilities. Grip sensing and/or finger tracking algorithms often infer grip/finger information from the change observed in the sensor measurements (e.g., derivatives), ratios of the sensor measurements between different sensors, and/or correlation between different measurements or derived measurements (as described respect to FIG. 2). For this reason, it is important, for any point along the side of the mobile device (or at least for any point along the span of the first strips), that at least one or more of the first strips can generate capacitive sensor measurements which adequately supports these grip sensing and/or finger tracking algorithms. Otherwise, the grip sensing and/or finger tracking algorithms would not be able to accurately distinguish between nuanced grips or precisely determine the position of a finger along the side of the mobile device.

When a response from a first strip saturates, the algorithm is likely to not able to tell where the metal ball is along the length of that first strip based on the capacitive sensor readings from that first strip since the response does not vary along the length of that first strip. Conversely, when a response from that first strip is tapering or increasing, the algorithm is likely to be able to tell (from the capacitive sensor readings from that first strip) where the metal ball is relative to the ends of that first strip and where the metal ball is moving based on information derivable from the responses: sign of derivative(s), magnitude of the ratios, correlations between data, etc. The lengths of the strips and spacings between strips can directly affect the coverage of these tapering/increasing responses on the side of the mobile device. Optimally, one or more of the strips should generate a meaningful/informative response at any point along the side of the mobile device, or at least at any point along the span of the first strips.

To ensure that the capacitive sensing apparatus is optimal for grip sensing and/or finger tracking, the first strips have respective lengths and spacing(s) between the first strips, and the second strips have respective lengths and spacing(s) between the second strips. The lengths and spacings are important when designing a capacitive sensing apparatus which can provide suitable responses along the length of the mobile device to support optimal grip sensing and/or finger tracking. In particular, selecting the optimal length and spacing is important for parts along the length of the mobile device where a user touches most, or where precision for grip sensing and/or finger tracking is needed most.

In general, the lengths of the sensors should be kept short, or at a minimum to reduce the span of "dead zones" where the respective responses saturates. The spacing of the sensors should be kept close enough (and not too far apart) so that the tapering/increasing responses of the respective capacitors can overlap and/or bleed into the "dead zones" so that when one response from one sensor saturates, another response from another sensor can provide a varying response, i.e., the information suitable for grip sensing and/or finger tracking. Respective lengths of the first strips and spacing(s) between the first strips should be provided such that, over the span of the first strips along the first line, one or more of the first strips is configured to generate a tapering or increasing response when an object moves along the first line, or phrased differently, respective lengths of the first strips and spacing(s) between the first strips should be provided such that, over the span of the first strips along the first line, at least one of the first strips is configured to not generate a saturated response as an object moves along the first line. A typical capacitive sensor apparatus would include strips having a variety of lengths and spacings.

These aforementioned desirable characteristics of the capacitive sensing apparatus not only applies to the example shown in FIG. 3, but the characteristics continue apply for embodiments using two or more strips on each side.

Example: 6-Sensor Design

Figure 4:
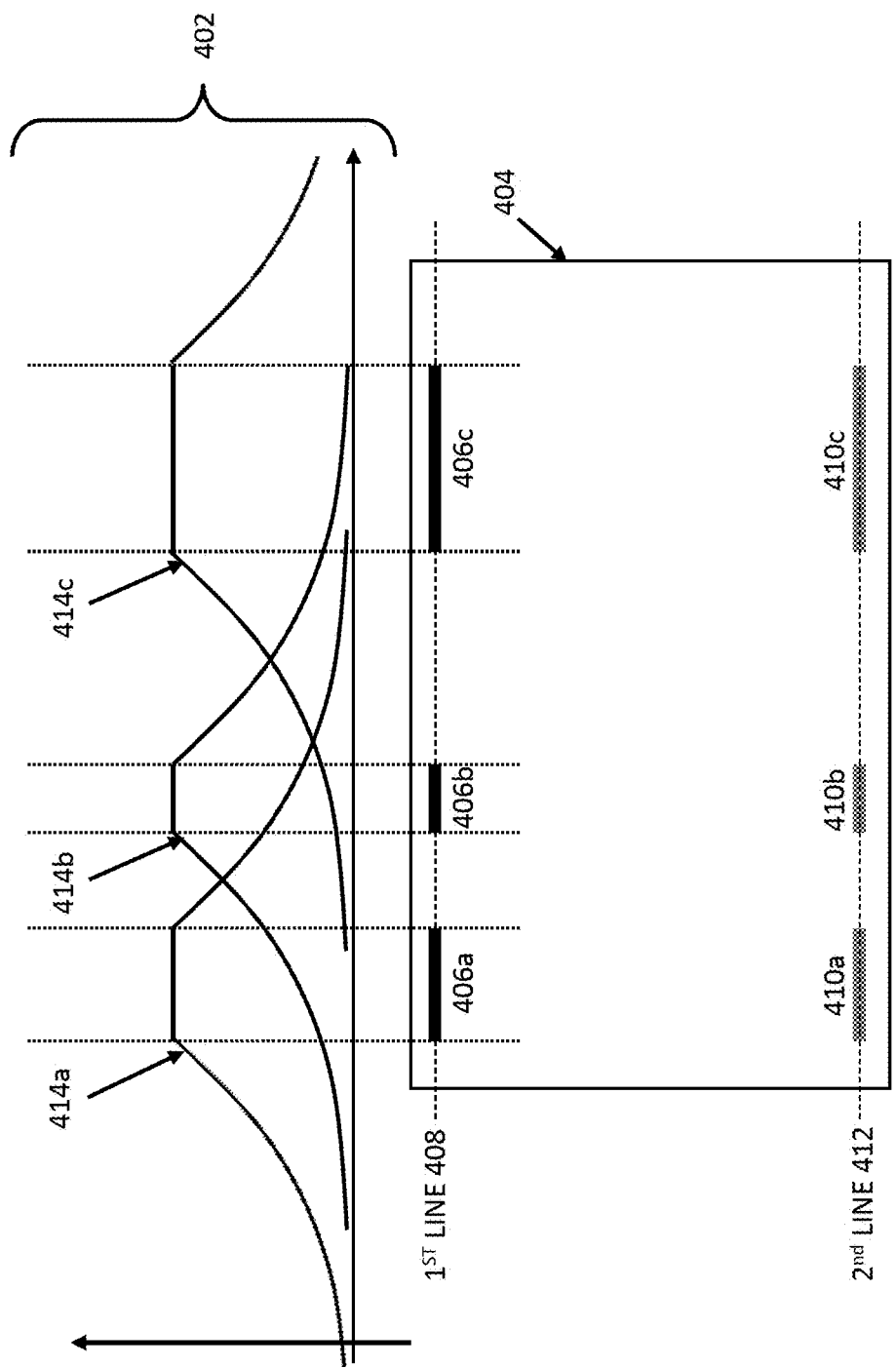
FIG. 4 shows another exemplary capacitive sensing apparatus for a mobile device and illustrative response curves generated by capacitive sensors of the capacitive sensing apparatus, according to some embodiments of the disclosure.

FIG. 4 shows another exemplary capacitive sensing apparatus for a mobile device and illustrative response curves generated by capacitive sensors of the capacitive sensing apparatus, according to some embodiments of the disclosure. FIG. 4 includes an exemplary response plot 402 and an exemplary mobile device 404 (e.g., a smart phone, a tablet, etc.). Furthermore, the FIGURE shows an exemplary capacitive sensing apparatus usable with the mobile device 404. The capacitive sensing apparatus can have 3 sensors on each side, which makes up a total of 6 sensors altogether.

In this example, an (extra) middle strip is provided for a side of the mobile device 404. Generally speaking, providing more strips can provide more data for the grip sensing and/or finger tracking algorithms and thus improves performance thereof. The capacitive sensing apparatus comprises first capacitive sensors including first strips 406a-c spatially arranged substantially along a first line 408. First strip 406a and 406c are considered first end strip and second end strip respectively (on either ends of the array strips along the first line 408), and first strip 406b is considered a middle strip. The exemplary capacitive sensing apparatus includes second capacitive sensors which includes second strips 410a-c spatially arranged substantially along a second line 412.

The response plot 402 shows responses 414a-c generated by respective capacitive sensors (first strips 406a-c respectively) when a small metal ball is rolled along a first side of the mobile device 404. The responses 414a-c correspond to capacitive sensor measurements obtained by respective capacitive sensors (first strips 406a-c respectively) with respect to the metal ball's position along the first side of the mobile device 404 or near the first line 408. As it can be seen from the response plot 402, for any point along the side of the mobile device 404, at least one of the first strips can generate capacitive sensor measurements which adequately supports these grip sensing and/or finger tracking algorithms. A similar set of first strips would exhibit similar behavior as the first strips 406a-c on the other side of the mobile device 404.

The following outlines some of the illustrative features of the responses 414a-c:

The first end strip and/or the second end strip is configured to generate a tapering or increasing response, when an object moves along the length of the middle strip. Specifically, the right tail of response 414a extends over the length of the middle strip (first strip 406b) and the left tail of response 414c extends over the length of the middle strip (first strip 406b). The middle strip (first strip 406b) generates a saturated response when an object moves along the length of the middle strip. It is thus desirable for the first end strip (first strip 406a) and/or the second end strip (first strip 406c) to generate a tapering or increasing response when an object moves along the length of the middle strip (first strip 406b).

The middle strip is configured to generate a tapering or increasing response, when an object moves along the length of the first end strip or the second end strip. By having the middle strip (first strip 406b), the tails of the response 414b from the middle strip can be used to provide the tapering or increasing response along the dead zones of responses 414a and 414c (i.e., when an object moves along the length of the first end strip (first strip 406a) or the second end strip (first strip 406c)).

Two of the first strips are each configured to generate a tapering or increasing response, when an object moves along the length of the spacing between the two strips (the strips cannot be spaced too far apart). The at least two tapering/increasing responses can help with accurate grip sensing and/or finger tracking when an object moves along the length of the spacings between the strips. More responses can be better than less responses since more information can be provided to the algorithms for grip sensing and/or finger tracking.

The middle strip is configured to generate a tapering or increasing response, when an object moves over the span of the first strips along the first line.

In some embodiments, the length of the middle strip is shorter than the first end strip and/or the second end strip because the fingers are frequently moving near the middle strip. By making the middle strip shorter, the dead zone of the response from the middle strip is made shorter.

Example: 8 Sensor Design

Figure 5:
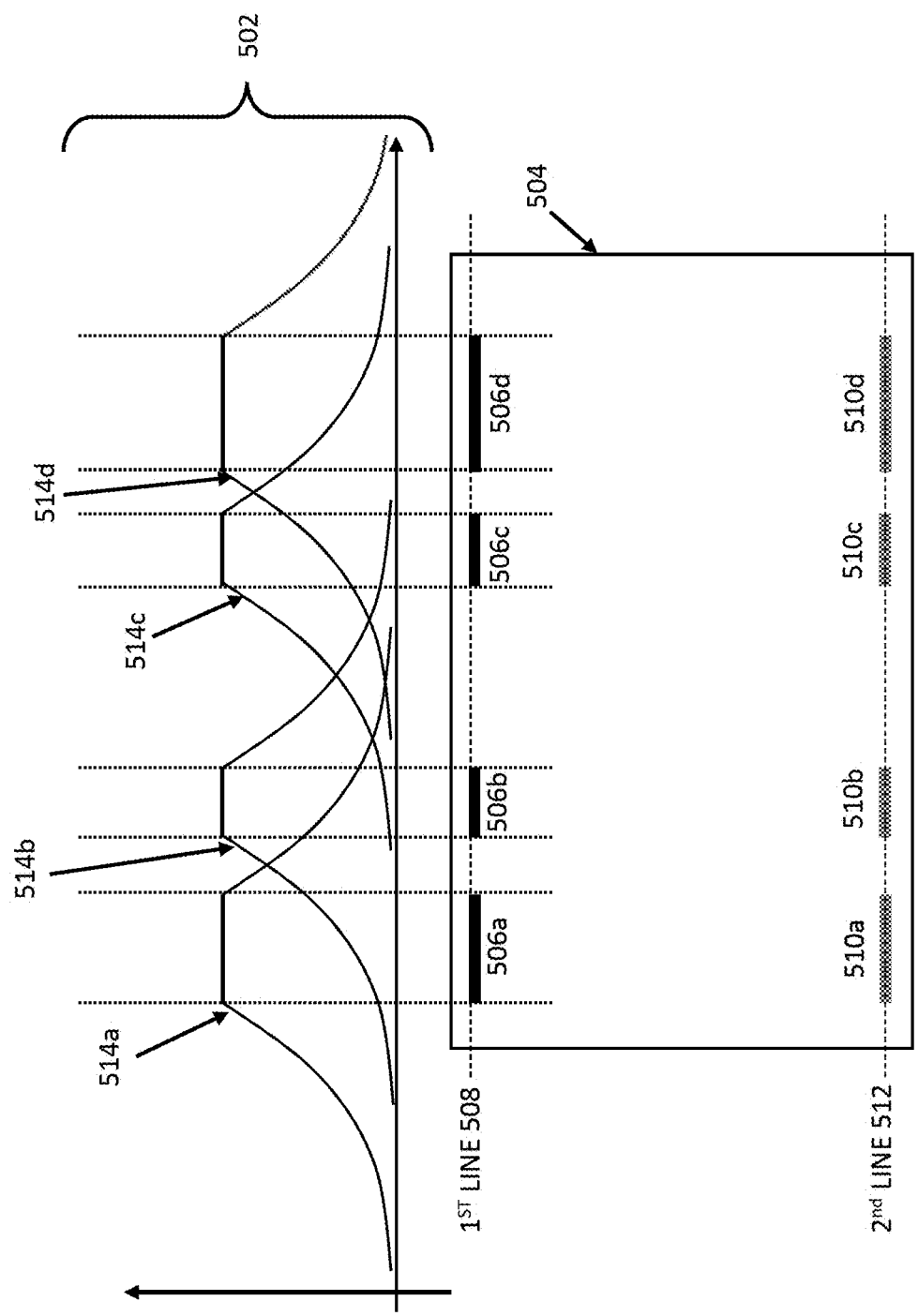
FIG. 5 shows another exemplary capacitive sensing apparatus for a mobile device and illustrative response curves generated by capacitive sensors of the capacitive sensing apparatus, according to some embodiments of the disclosure.

FIG. 5 shows another exemplary capacitive sensing apparatus for a mobile device and illustrative response curves generated by capacitive sensors of the capacitive sensing apparatus, according to some embodiments of the disclosure. FIG. 5 includes an exemplary response plot 502 and an exemplary mobile device 504 (e.g., a smart phone, a tablet, etc.). Furthermore, the FIGURE shows an exemplary capacitive sensing apparatus usable with the mobile device 504. The capacitive sensing apparatus can have 4 sensors on each side, which makes up a total of 8 sensors altogether.

In this example, two middle strips are provided for a side of the mobile device 504. Generally speaking, providing more strips can provide more data for the grip sensing and/or finger tracking algorithms and thus improves performance thereof. The capacitive sensing apparatus comprises first capacitive sensors including first strips 506a-d spatially arranged substantially along a first line 508. First strip 506a and 506d are considered first end strip and second end strip respectively (on either ends of the array strips along the first line 508), and first strips 506b and 506c are considered the middle strips. The exemplary capacitive sensing apparatus includes second capacitive sensors which includes second strips 510a-d spatially arranged substantially along a second line 512.

In the example shown in FIG. 5, the first capacitive sensors (on one side of the mobile device 504) has four first strips 506a-d generating responses 514a-d respectively. A similar set of first strips would exhibit similar behavior as the first strips 506a-d on the other side of the mobile device 504.

The following outlines some of the illustrative features of the responses 514a-d:

The first end strip and/or the second end strip is configured to generate a tapering or increasing response, when an object moves along the length of any one of the one or more middle strips. This ensures good grip sensing and/or finger tracking in the dead zones of the middle strips.

One or more ones of the one or more middle strips is configured to generate a tapering or increasing response, when an object moves along the length of the first end strip or the second end strip. This ensures good grip sensing and/or finger tracking in the dead zones of the end strips.

Two of the first strips are each configured to generate a tapering or increasing response, when an object moves along the length of the spacing between the two strips. This ensures good grip sensing and/or finger tracking in the span of the spacings between strips. In some cases, the two middle strips alone should generate the tapering/increasing responses between the two middle strips without the help from the end strips. It is an added bonus if one or both of the end strips also generate a tapering/increasing response between the two middle strips.

One or more ones of the middle strips is configured to generate a tapering or increasing response, when an object moves over the span of the first strips along the first line. This can be provided easily when there are two (or more) middle strips.

In some embodiments, the one or more middle strips are shorter in length than the first end strip and/or the second end strip.

Example: 10-Sensor Design

Figure 6:
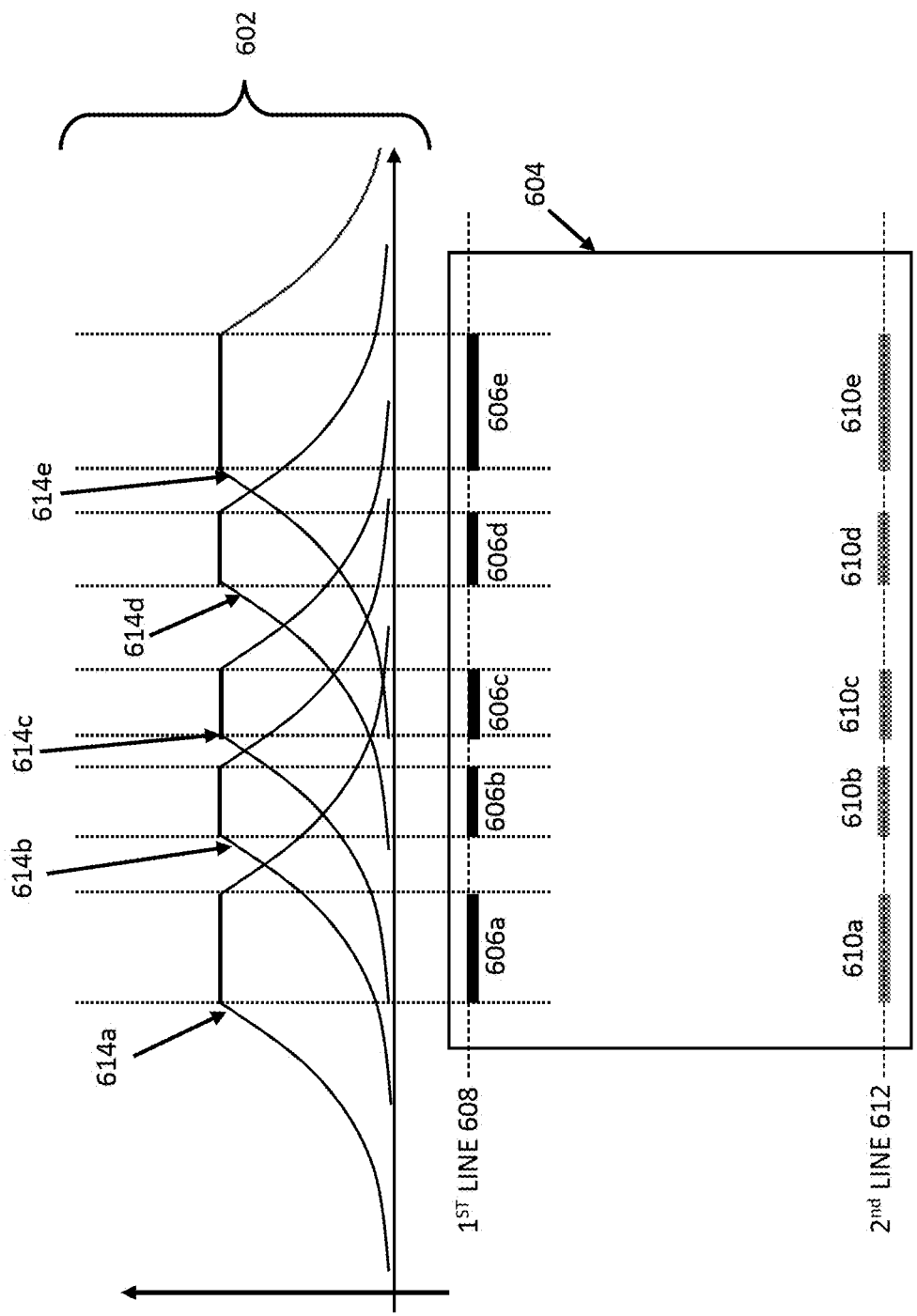
FIG. 6 shows another exemplary capacitive sensing apparatus for a mobile device and illustrative response curves generated by capacitive sensors of the capacitive sensing apparatus, according to some embodiments of the disclosure.

FIG. 6 shows another exemplary capacitive sensing apparatus for a mobile device and illustrative response curves generated by capacitive sensors of the capacitive sensing apparatus, according to some embodiments of the disclosure. FIG. 6 includes an exemplary response plot 602 and an exemplary mobile device 604 (e.g., a smart phone, a tablet, etc.). Furthermore, the FIGURE shows an exemplary capacitive sensing apparatus usable with the mobile device 604. The capacitive sensing apparatus can have 5 sensors on each side, which makes up a total of 10 sensors altogether.

In this example, two middle strips are provided for a side of the mobile device 604. Providing more strips can provide more data for the grip sensing and/or finger tracking algorithms and thus improves performance thereof. The capacitive sensing apparatus comprises first capacitive sensors including first strips 606*a-e* spatially arranged substantially along a first line 608. First strip 606*a* and 606*e* are considered first end strip and second end strip respectively (on either ends of the array strips along the first line 608), and first strips 606*b-d* are considered the middle strips. The exemplary capacitive sensing apparatus includes second capacitive sensors which includes second strips 610*a-e* spatially arranged substantially along a second line 612.

In the example shown in FIG. 6, the first capacitive sensors (on one side of the mobile device 604) has five first strips 606*a-e* generating responses 614*a-e* respectively. A similar set of first strips would exhibit similar behavior as the first strips 606*a-e* on the other side of the mobile device 604. The following outlines some of the illustrative features of the responses 614*a-e*:

The first end strip and/or the second end strip is configured to generate a tapering or increasing response, when an object moves along the length of any one of the one or more middle strips. This ensures good grip sensing and/or finger tracking in the dead zones of the middle strips.

One or more ones of the one or more middle strips is configured to generate a tapering or increasing response, when an object moves along the length of the first end strip or the second end strip. This ensures good grip sensing and/or finger tracking in the dead zones of the end strips.

Two of the first strips are each configured to generate a tapering or increasing response, when an object moves along the length of the spacing between the two strips. This ensures good grip sensing and/or finger tracking in the span of the spacings between strips.

One or more ones of the middle strips is configured to generate a tapering or increasing response, when an object moves over the span of the first strips along the first line. This can be provided easily when there are two (or more) middle strips.

In some embodiments, the one or more middle strips are shorter in length than the first end strip and/or the second end strip.

Teachings of the five strips design can easily extend to using six or more strips on a side of the mobile device, by providing one or more of the features described herein.

Differential Tracing

Capacitive sensing is highly sensitive to the environment. For this reason, capacitive sensing can be susceptible to noise issues caused by undesirable changes in the environment. For instance, one of these noise issues can be caused by hot electronic components near the capacitive sensing apparatus. Hot electronics can create a temperature gradient which affects the dielectric of the environment surrounding the capacitive sensor. The effect of the dielectric can thus affect the capacitive sensing measurements in an undesirable way.

FIG. 7 shows an exemplary capacitive sensing apparatus for a mobile device having differential tracing, according to some embodiments of the disclosure. The capacitive sensing apparatus includes a capacitive sensor 702 (e.g., a strip) connectable to capacitive sensing controller 704. Typically, a wire which connects the capacitive sensor 702 and the capacitive sensing controller 704 may be required to travel a distance traversing over other electronic components. The wire connected to the capacitive sensor also acts as a capacitive sensor which can be influenced by the environment surrounding the wire. The electronic components, such as power amplifier 706 and applications processor 708, can heat up to undetermined temperatures at different points in time when the mobile device is being used. The temperature gradients generated by these electronic components can thus generate local effects over the length of the wire.

To cancel out these local effects, the capacitive sensing apparatus can employ differential tracing. The differential tracing can include a first trace ("CIN1") connectable to a first input terminal ("1") of a capacitive sensing controller 704 and connected the one of the first capacitive sensors (capacitive sensor 702), and a second trace ("CIN2") connectable a second terminal ("2") of the capacitive sensing controller 704 and not connected to the one of the first capacitive sensors (capacitive sensor 702). Because the first trace and the second trace runs next to each other, local effects from the temperature gradients on the traces can be cancelled out if the capacitive sensing controller or some other module observes the difference in capacitive sensor measurements obtained via the first input terminal and the second input terminal (instead of just observing the capacitive sensor measurements from only the first input terminal in a single-ended design). Any number of the capacitive sensors can employ differential tracing to reduce the artifacts caused by local effects on the traces.

Sensor Strip Design

Another source of artifacts which can affect the capacitive sensor measurements is the parasitic capacitance which can build up between a capacitive sensor 802 (i.e., any one of the strips) and the materials of the mobile device surrounding the capacitive sensor. One way to reduce the parasitic capacitance of a capacitive sensor is to reduce the area of the capacitive sensor. However, decreasing the area of the capacitive sensor is not always possible due to the constraints on the length of the strips when trying to provide capacitive sensors optimal for grip sensing and/or finger tracking. Instead of decreasing the length to reduce the area, the capacitive sensors can adopt a physical design to reduce undesirable parasitic capacitances.

FIG. 8 shows an exemplary capacitive sensor of the capacitive sensing apparatus, according to some embodiments of the disclosure. The capacitive sensing apparatus includes a capacitive sensor 802 (i.e., a strip) and illustrative traces 804. One possible feature for reducing the area of the capacitive sensor 802 is to provide one or more rounded or cut off corners to reduce the amount of area used by capacitive sensor 802. Another possible feature for reducing the area of the capacitive sensor 802 is to provide a cut out or hollow portion at the center or near the center of the capacitive sensor 802 to reduce the amount of area used by the capacitive sensor 802. The shape of the cutout or hollow portion can vary depending on the application. Care is taken to not reduce the effective area of the capacitive sensor 802 because the area is related to the dynamic range of responses obtainable by the capacitive sensor.

Placement of Capacitive Sensing Apparatus

One of the few considerations for using the capacitive sensing apparatuses disclosed herein is the placement of the apparatus with respect to the mobile device. FIGS. 9A-C, 10A-C, and 11A-C show exemplary placements of the capacitive sensing apparatus with respect to an inner chassis and an outer shell of a mobile device, according to some embodiments of the disclosure. FIGS. 9A-C, 10A-C, and 11A-C are cross section views of a mobile device 902 taken at the line marked by A and A'.

The inner chassis is typically a molded container or housing for enclosing various electronics associated the mobile device (e.g., printed circuit boards, antenna, processors, display electronics, etc). The outer shell is typically a cover which encloses the molded container, and the outer shell can be removable or permanently affixed to the inner chassis or some other part of the mobile device.

For FIGS. 9A-C, 10A-C, and 11A-C, the inner rectangle with rounded corners represents an example inner chassis of a mobile device, the outer rectangle with rounded corners presents an example outer shell of the mobile device. The black thick lines represents strips used as capacitive sensors (the weight of the black thick lines correspond to thickness of the strips, and not the length of the strips). A small gray rectangle represents an electrical connection between the outer shell and the inner chassis (e.g., contacts for connecting the capacitive sensors to a component in the electronic device)

FIGS. 9A-C show that at least part of the capacitive sensing apparatus (one or more of the capacitive sensors) can be positioned in one or more cavities of the inner chassis. Cutouts can be made in the inner chassis to allow the sensors to be placed with the inner chassis. This configuration allows the sensors to fit within the form factor of the inner chassis design by utilizing unused space taken up by the inner chassis to cradle the sensors.

FIGS. 10A-C show that at least part of the capacitive sensing apparatus is attached to one or more surfaces of the inner chassis. For instance, the capacitive sensing apparatus can be attached to the inner chassis using a suitable adhesive or adhesion method. This configuration allows the inner chassis to be unchanged in its design (no cut outs required).

FIGS. 11A-C show that at least part of the capacitive sensing apparatus can be provided in the outer shell (can be embedded in the shell or sits on a cutout in the shell) or on a surface of the outer shell configured to face towards the mobile device. In some cases, a connection can be provided to electrically connect the capacitive sensing apparatus to a capacitive sensing controller enclosed in the inner chassis. For instance, the outer shell may include one or more conductive pads connectable to one or more pogo pins on the inner chassis.

FIGS. 9A, 10A, and 11C show preferred placements of the sensors. Placing the sensors directly on the sides allows the sensors to be near places where part of a hand/fingers touch most. This allows for optimal capacitive sensor measurements to be captured for grip sensing and/or finger tracking. FIGS. 9B, 10B, and 11B are also desirable placements for the sensors.

Example Flex Circuit Design

The capacitive sensors of the capacitive sensing apparatus can be provided on a flexible circuit to reduce the footprint needed to implement a capacitive sensing apparatus on a mobile device. FIG. 12 shows an exemplary capacitive sensing apparatus in the form of a flexible circuit, according to some embodiments of the disclosure. A flex circuit can be include traces provided on a main portion 1202 of the flex circuit extending from a connection to the capacitive sensing controller to appropriate positions for placing the capacitive sensors provided on legs 1204 and 1206 of the flex circuit.

FIG. 13 shows an exemplary capacitive sensing apparatus arranged with respect to a mobile device, according to some embodiments of the disclosure. The main portion 1202 allows the traces to run from a connection to the mobile device and along a side of mobile device 1302 on a first surface. The legs 1204 and 1204 provides a way for the capacitive sensing apparatus to bend over and allow the capacitive sensors to be placed on the side of the mobile device 1302 on a second surface joining the first surface. In some cases, the first surface and the second surfaces are part of one curved surface.

Variations of the Capacitive Sensing Apparatus

FIG. 14 shows an exemplary capacitive sensing apparatus having L-shaped capacitive sensors, according to some embodiments of the disclosure. For embodiments where the capacitive sensing apparatus does not have many sensors, it is possible to improve the capacitive sensing apparatus by providing an L-shaped sensors for sensors at the corners of the mobile device. This improves grip detection where sensor measurements can provide a better indication of when a palm digs into the corner of the device. L-shaped sensors can be used at the either or both ends of the first capacitive sensors and/or the second capacitive sensors for any of the embodiments disclosed herein.

Typically, the spatial arrangement of the first capacitive sensors is substantially symmetric to the spatial arrangement of the second capacitive sensors with respect to an axis parallel to the first line. However, while the examples shown herein illustrate symmetric capacitive sensors where the spatial arrangement and designs are the same for both the first capacitive sensors (on one side of the mobile device) and the second capacitive sensors (on the opposite side of the mobile device), it is possible that the capacitive sensors do not need to be symmetric. The spatial arrangement of the first capacitive sensors can be asymmetric to the spatial arrangement of the second capacitive sensors with respect to an axis parallel to the first line. For instance, it is possible to provide a different number of sensors on each side. In another instance, it is possible to provide sensors having different lengths and/or spacings on each side. Asymmetric designs are allowed so long as the desired features of the capacitive sensor apparatuses are substantially met. The possibility of asymmetric designs can enable engineers implementing the capacitive sensing apparatus on a particular electronic device to more easily provide the capacitive sensors since many other parts of the electronic device can impose constraints on sensor placements and sizing. Furthermore, it is noted that capacitive sensors do not need to extend over the complete length of the electronic device to provide the desired responses. It is the responses from the capacitive sensors which preferably extend over the complete length of the electronic device for optimal grip sensing and/or finger tracking.

It is noted that the first capacitive sensors are preferably positioned near one edge or side of the mobile device to which a user's hand is expected to touch frequently. The alignment of the first strips to the first line do not have to be exact, but it is preferred that the first strips are spatially arranged as segments in a line to substantially match up the (substantially straight) edge of the mobile device. The second capacitive sensors are preferably positioned near the other edge or side of the mobile device to which a user's hand is expected to touch frequently. The second line can be substantially parallel to the first line, especially if the mobile is in a regular form, and a user is expected to grip the mobile device from two opposite sides. The alignment of the second strips to the second line do not have to be exact, but it is preferred that the second strips are spatially arranged as segments in a line to substantially match up the other (substantially straight) edge of the mobile device. Although the sensors described herein are placed on the long sides of the electronic device, it can also be placed on the shorter side as well or on all sides of the rectangular electronic device. The strips are preferred to run in a straight line and have a linear form, although it is possible that the strips can be curved or exhibit non-straight edges.

Materials usable for the capacitive sensors can include any suitable metallic material, any suitable carbon-based material, indium tin oxide or other heavily doped semiconductor, any suitable conductive plastics, or any suitable conductive material usable as capacitive sensors.

In the discussions of the embodiments above, the components described herein can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the figures may be implemented on a board or in some cases, a flexible circuit board of an associated electronic device. The board can be a general circuit board that can hold various components of the internal electronic system of the electronic device (e.g., an application processor, a capacitive sensing controller, etc.) and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the grip sensing and/or finger tracking functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES are applicable to any integrated circuits that involve human interaction. In certain contexts, the features discussed herein can be applicable to consumer electronic devices, aerospace systems, automotive systems, industrial electronic systems, medical systems, audio and video equipment, instrumentation and other digital-processing-based systems to which humans can interact.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the figures and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note that all optional features of the apparatus described above may also be implemented with respect to the method or process described herein and specifics in the examples may be used anywhere in one or more embodiments.

It is also important to note that the functions related to capacitive sensors, illustrate only some of the possible capacitive sensing functions that may be executed by, or within, systems illustrated in the figures. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims. The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A capacitive sensing apparatus usable with an electronic device with a display screen for grip sensing and/or finger tracking, wherein the capacitive sensing apparatus comprises:

first capacitive sensors comprising a first set of strips spatially arranged in a first line on a first edge of the electronic device, the first set of strips having respective lengths and spacings between the first set of strips spanning lengthwise across the first line, wherein each strip of the first set of strips is configured to generate a respective response to an object positioned near the first line; and wherein the respective response of each strip of the first set of strips is saturated and non-varying when an object is positioned along the length of a respective strip of the first set of strips, and the respective response of each strip of the first set of strips is varying and tapers off as an object moves away from either end of the length a respective strip of the first set of strips;

wherein the respective lengths of each of the first set of strips are predetermined to reduce a span in which a respective response of each strip of the first set of strips may be saturated, and the respective spacings of the first set of strips are predetermined such that a respective varying and tapering response between each strip of the first set of strips is calculated as a reciprocal of a distance of the object, at least in part;

one or more processors configured for:
receiving first capacitive sensor measurements generated by each strip of the first set of strips in response to an object positioned near the first line;
determining ratio values from the first capacitive sensor measurements wherein, the ratio values represent magnitudes of each strip of the first set of strips and are based on calculating one or more gain independent ratios of the first capacitive sensor measurements;
generating a cross-correlation matrix from at least one of the first capacitive sensor measurements and the ratio values;
inferring grip sensing information or finger tracking information based on at least one of the ratio values and the cross-correlation matrix; and
reporting the grip sensing information or finger tracking information.

2. The capacitive sensing apparatus of claim 1, further comprising:

second capacitive sensors comprising a second set of strips spatially arranged in a second line on a second edge of the electronic device opposite of the first edge the second set of strips having respective lengths and spacings between the second set of strips spanning lengthwise across the second line, wherein each strip of the second set of strips is configured to generate a respective response to an object positioned near the second line; and the one or more processors further configured for:
receiving second capacitive sensor measurements generated by each strip of the second set of strips in response to an object positioned near the second line;
determining ratio values from the second capacitive sensor measurements;
generating a cross-correlation matrix from the second capacitive sensor measurements or the ratio values;
inferring grip sensing information or finger tracking information; and reporting the grip sensing information or finger tracking information.

3. The capacitive sensing apparatus of claim 1, wherein: at least one of the first set of strips is a single strip forming an L-shape and is positioned at one or more corners of the electronic device.

4. The capacitive sensing apparatus of claim 1, wherein: determining ratio values includes calculating a gain independent ratio: (A−B)/(A+B), wherein A is the first capacitive sensor measurement from one of the first set of strips and B is the first capacitive sensor measurement from another of the first set of strips.

5. The capacitive sensing apparatus of claim 1, wherein: the first set of strips comprises a first end strip, one or more middle strips, and a second end strip, and wherein the first end strip and/or the second end strip is configured to generate a tapering or increasing response, when an object moves along the length of any one of the one or more middle strips.

6. The capacitive sensing apparatus of claim 5, wherein: one or more of the one or more middle strips is configured to generate a tapering or increasing response, when an object moves along the length of the first end strip or the second end strip.

7. The capacitive sensing apparatus of claim 1, wherein: two of the first set of strips are each configured to generate a tapering or increasing response, when an object moves along the length of the spacing between the two strips.

8. The capacitive sensing apparatus of claim 5, wherein: one or more of the middle strips is configured to generate a tapering or increasing response, when an object moves over the span of the first set of strips along the first line.

9. The capacitive sensing apparatus of claim 5, wherein: the length of one or more middle strips is short to reduce span of dead zone along the first line where the respective response(s) of the one or more middle strips saturates.

10. The capacitive sensing apparatus of claim 2, wherein: the spatial arrangement of the first capacitive sensors is asymmetric to the spatial arrangement of the second capacitive sensors with respect to an axis parallel to the first line.

11. The capacitive sensing apparatus of claim 1, further comprising:
differential tracing for one of the first capacitive sensors, wherein the differential tracing comprises:
a first trace connectable to a first input terminal of a capacitive sensing controller and connected to the one of the first capacitive sensors; and
a second trace running next to the first trace connectable a second terminal of the capacitive sensing controller and not connected to any one of the first capacitive sensors.

12. The capacitive sensing apparatus of claim 1, wherein: one of the first set of strips comprises a hollow portion at a center of the strip.

13. The capacitive sensing apparatus of claim 1, wherein: one of the first set of strips comprises a sensor on a first surface and the traces connected to the sensor on a second surface adjoining the first surface.

14. The capacitive sensing apparatus of claim 1, further comprising:
a removable outer shell usable for enclosing an electronic device, said removable outer shell comprising conductive pads as electrical contacts for connecting the first capacitive sensors to a component in an inner chassis of the electronic device;
wherein the first capacitive sensors are provided in the removable outer shell or on a surface of the removable outer shell configured to face towards the mobile device.

15. An electronic device with a display screen comprising:
an inner chassis molded housing for enclosing electronics associated with the electronic device; and
a capacitive sensing flexible circuit connectable to one or more of the electronics of the inner chassis molded housing for grip sensing and/or finger tracking, wherein the capacitive sensing flexible circuit comprises:
first capacitive sensors comprising a first set of strips spatially arranged in a first line next to a first edge of the inner chassis, the first set of strips having respective lengths and spacings between each of the first set of strips spanning lengthwise across the first line, wherein each of the first set of strips comprises a sensor on a first surface and traces connected to the sensor on a second surface adjoining the first surface;
and wherein a respective response of each strip of the first set of strips is saturated and non-varying when an object is positioned along the length of a respective strip of the first set of strips, and the respective response of each strip of the first set of strips is varying and tapers off as an object moves away from either end of the length a respective strip of the first set of strips;
further wherein the respective lengths and spacing of each of the first set of strips are predetermined to reduce a span in which a respective response of each strip of the first set of strips may be saturated, and the respective spacings of the first set of strips are predetermined such that a respective varying and tapering response between each strip of the first set of strips is calculated as a reciprocal of a distance of the object, at least in part;
one or more processors configured for:
receiving first capacitive sensor measurements generated by each strip of the first set of strips in response to an object positioned near the first line;
determining ratio values from the first capacitive sensor measurements wherein, the ratio values represent magnitudes of each strip of the first set of strips and are based on calculating one or more gain independent ratios of the first capacitive sensor measurements;
generating a cross-correlation matrix from at least one of the first capacitive sensor measurements and the ratio values;
inferring grip sensing information or finger tracking information based on at least one of the ratio values and the cross-correlation matrix; and
reporting the grip sensing information or finger tracking information.

16. The electronic device of claim 15, wherein: at least part of the capacitive sensing flexible circuit is positioned in one or more cavities of the inner chassis molded housing.

17. The electronic device of claim 15, wherein: at least part of the capacitive sensing flexible circuit is attached to one or more surfaces of the inner chassis molded housing using an adhesive.

18. The electronic device of claim 15, wherein:
the traces to the first capacitive sensors are on a main portion of the capacitive sensing flexible circuit; and
the first capacitive sensors are on respective legs of the capacitive sensing flex circuit, wherein the legs are bent and wrap around adjoining surfaces of the inner chassis molded housing.

\* \* \* \* \*